(12) United States Patent
Ishihara et al.

(10) Patent No.: US 9,963,220 B2
(45) Date of Patent: May 8, 2018

(54) FLAP DEPLOYING DEVICE AND AIRCRAFT

(71) Applicant: MITSUBISHI AIRCRAFT CORPORATION, Aichi (JP)

(72) Inventors: Kenya Ishihara, Aichi (JP); Zenta Sugawara, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 234 days.

(21) Appl. No.: 14/105,814

(22) Filed: Dec. 13, 2013

(65) Prior Publication Data

US 2014/0175217 A1  Jun. 26, 2014

(30) Foreign Application Priority Data

Dec. 26, 2012  (JP) ................................. 2012-282531

(51) Int. Cl.
*B64C 9/16* (2006.01)
*B64C 9/22* (2006.01)
*B64C 13/28* (2006.01)

(52) U.S. Cl.
CPC .................. *B64C 9/16* (2013.01); *B64C 9/22* (2013.01); *B64C 13/28* (2013.01)

(58) Field of Classification Search
CPC .. B64C 9/16–9/26; B64C 13/24; B64C 13/28; B64C 13/34
See application file for complete search history.

(56) References Cited

U.S. PATENT DOCUMENTS

| 2,908,454 | A | * | 10/1959 | De Wolff | B64C 9/16 244/216 |
| 4,323,209 | A | * | 4/1982 | Thompson | B64C 23/06 244/199.1 |
| 4,399,970 | A | * | 8/1983 | Evans | B64C 9/24 244/214 |

(Continued)

FOREIGN PATENT DOCUMENTS

| JP | 61-47800 U | 3/1986 |
| JP | 2008-529871 A | 8/2008 |

(Continued)

OTHER PUBLICATIONS

Office Action for JP2012-282531 dated Jul. 26, 2016.

*Primary Examiner* — Peter M Poon
*Assistant Examiner* — Magdalena Topolski
(74) *Attorney, Agent, or Firm* — Pearne & Gordon LLP

(57) ABSTRACT

The flap deploying device for a flap disposed at a leading edge or a trailing edge of a main wing of the aircraft, the deploying device including: a drive source; a moving mechanism with a moving body advancing and retracting by power of the drive source; a carriage mechanism that carries advancing and retracting motion of the moving body to the flap so as to deploy the flap between a retracted position and a deployed position; and a rail that guides the carriage mechanism. Since the moving mechanism is arranged lateral to the rail in the wingspan direction of the main wing, the dimension of the wing in a thickness direction can be reduced at least by a dimension corresponding to the moving mechanism. Therefore, the wing can be made thinner, or the projecting height of a flap track fairing can be reduced.

9 Claims, 7 Drawing Sheets

(56) References Cited

U.S. PATENT DOCUMENTS

| | | | | |
|---|---|---|---|---|
| 4,471,928 A | * | 9/1984 | Cole | B64C 9/00 |
| | | | | 244/215 |
| 4,687,162 A | * | 8/1987 | Johnson | B64C 9/24 |
| | | | | 244/213 |
| 4,995,575 A | | 2/1991 | Stephenson | |
| 5,161,757 A | * | 11/1992 | Large | B64C 9/18 |
| | | | | 244/213 |
| 9,016,636 B2 | * | 4/2015 | Parker | B64C 9/02 |
| | | | | 244/214 |
| 2007/0102587 A1 | * | 5/2007 | Jones | B64C 9/22 |
| | | | | 244/214 |
| 2009/0134281 A1 | * | 5/2009 | Engelbrecht | B64C 9/16 |
| | | | | 244/215 |
| 2010/0001125 A1 | * | 1/2010 | Cavalier | B64C 13/28 |
| | | | | 244/99.3 |
| 2010/0308162 A1 | | 12/2010 | Gartelmann | |
| 2011/0006154 A1 | * | 1/2011 | Maresko | B64C 13/28 |
| | | | | 244/99.2 |
| 2012/0000304 A1 | * | 1/2012 | Hamminga | E05F 15/41 |
| | | | | 74/89.23 |
| 2012/0012712 A1 | * | 1/2012 | Eden | B64C 3/28 |
| | | | | 244/201 |
| 2015/0090843 A1 | * | 4/2015 | Guering | B64C 3/50 |
| | | | | 244/215 |

FOREIGN PATENT DOCUMENTS

| | | |
|---|---|---|
| JP | 2011-504149 A | 2/2011 |
| JP | 2011-514149 A | 2/2011 |
| WO | 2006084157 A2 | 8/2006 |
| WO | 2011156347 A2 | 12/2011 |

* cited by examiner

FLAP DEPLOYING DEVICE AND AIRCRAFT

BACKGROUND OF THE INVENTION

Field of the Invention

The present invention relates to a deploying device for a flap provided at a leading edge or a trailing edge of a main wing of an aircraft, and an aircraft.

Description of the Related Art

In aircrafts, fuel consumption is improved by employing a main wing with a thin airfoil section having a small drag coefficient. Since the airfoil section as described above has a low lift coefficient at low speed, takeoff/landing performance is deteriorated. To allow the aircrafts to take off from and land on a short runway, a flap is provided at a leading edge or a trailing edge of the main wing. When the flap is deployed in a chord direction, a lift coefficient much higher than the original lift coefficient generated by the airfoil section is temporarily obtained. The flap is deployed by a deploying device that is accommodated within the main wing.

In general, the flap deploying device includes a drive source and an actuator including a mechanism that converts power of the drive source to motion of the flap. For example, National Publication of International Patent Application No. 2008-529871 discloses an actuator using a hydraulic cylinder. National Publication of International Patent Application No. 2011-504149 also discloses a rotating pinion and a toothed movement element (rack) that meshes with the pinion. A configuration in which a screw jack is used as an actuator has been also known.

In recent years, there is a demand for improvement in the fuel consumption of aircrafts, and thus, there is a demand for further reduction in the thickness of main wings. However, there are some restrictions. One of the restrictions relates to the flap deploying device described above. Since the device occupies a substantial space within the main wing, the main wing cannot be made thinner depending on a relationship with various components accommodated within the main wing. A portion of the flap deploying device that cannot be accommodated within the main wing (a non-accommodated portion) is covered with a flap track fairing (abbreviated to FTF below) so as to reduce air resistance. If the non-accommodated portion is increased, only the FTF cannot sufficiently reduce the air resistance (improve the fuel consumption).

The present invention has been made in view of the technical problem as described above, and an object thereof is to provide a flap deploying device which can reduce the thickness of a wing by optimizing the arrangement of a flap deploying device.

SUMMARY OF THE INVENTION

To achieve the above object, the present invention is a deploying device which deploys a flap provided at a leading edge or a trailing edge of a main wing of an aircraft, the deploying device comprising: a drive source; a moving mechanism that comprises a moving body advancing and retracting by power of the drive source; a carriage mechanism that carries advancing and retracting motion of the moving body to the flap so as to deploy the flap between a retracted position and a deployed position; and a rail that guides the carriage mechanism, wherein the moving mechanism is arranged lateral to the rail in a wingspan direction of the main wing.

In the present invention, since the moving mechanism as an element of an actuator device is arranged lateral to the rail in the wingspan direction of the main wing, the dimension of the wing in a thickness direction can be reduced at least by a dimension corresponding to the moving mechanism. Therefore, in accordance with the present invention, the wing can be made thinner, or the projecting height of an FTF can be reduced.

In the flap deploying device according to the present invention, a screw jack including a screw that is rotationally driven by the drive source, and the moving body that meshes with the screw so as to be relatively rotatable may be used as the moving mechanism.

In the flap deploying device according to the present invention, the carriage mechanism including a first carriage section and a second carriage section that are rotatably coupled to each other may be used, the first carriage section and the second carriage section integrally moving along the rail.

Preferably, the rail is provided substantially along a wing chord direction.

The present invention also provides an aircraft comprising the flap deploying device described above.

In accordance with the present invention, since the moving mechanism is arranged lateral to the rail, the dimension of the main wing in the thickness direction can be reduced. Therefore, in accordance with the present invention, the main wing can be made thinner, or the projecting height of the FTF can be reduced.

DETAILED DESCRIPTION OF THE PREFERRED EMBODIMENTS

In the following, the present invention is described in detail based on an embodiment shown in the accompanying drawings.

Figure 1:
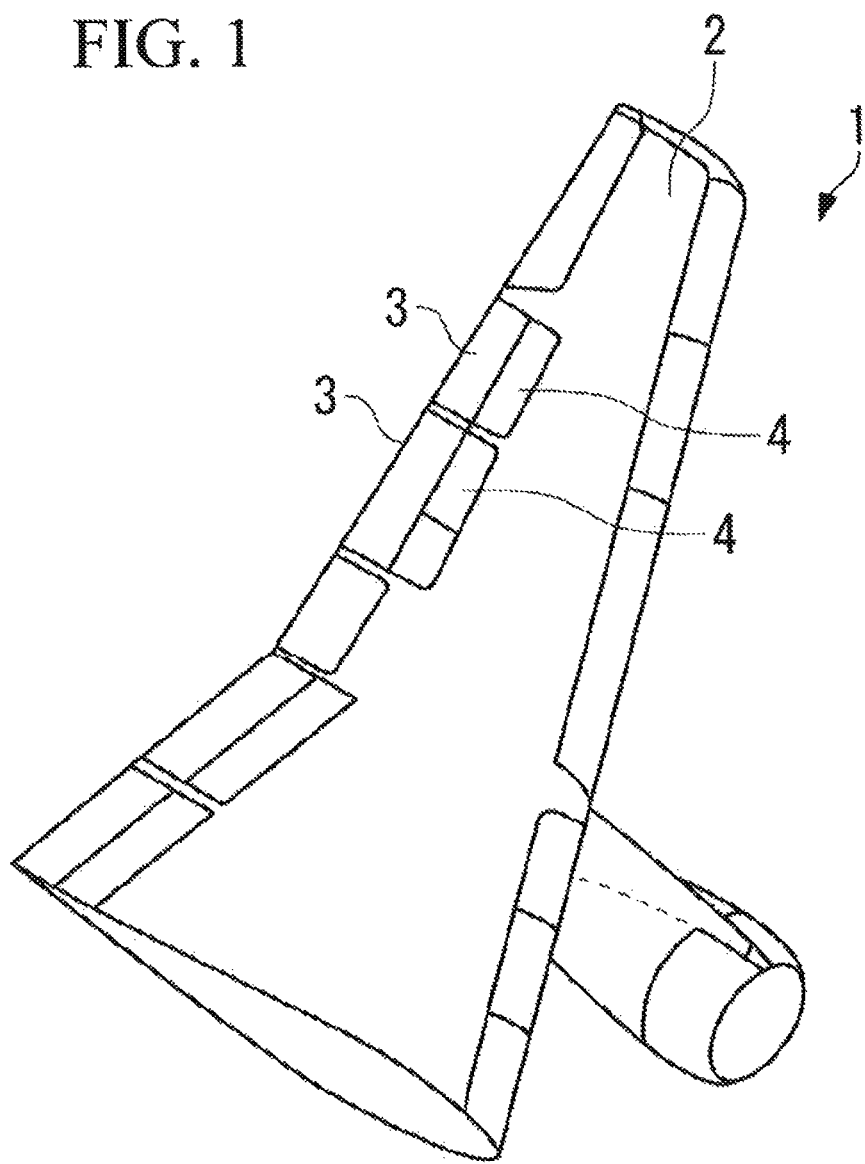
FIG. 1 is a perspective view illustrating a main wing of an aircraft.

The present embodiment relates to a flap 3 provided at a main wing 1 (a main wing body 2) of an aircraft as shown in FIG. 1. The flap 3 is arranged behind a spoiler 4 along a trailing edge of the main wing body 2. The flap 3 can be deployed between a cruising position and a takeoff/landing position by a deploying device 10 according to the present embodiment. While the aircraft is cruising, the flap 3 is placed at the cruising position (FIG. 2, may be referred to as retracted position below) that is flush with a wing surface of the main wing body 2. When the aircraft takes off or lands, the flap 3 is deployed and placed at the takeoff/landing position (FIG. 3, referred to as deployed position below).

The flap 3 may be arranged at the same position, or may be arranged at different positions when the airplane takes off and when the airplane lands.

In the following, the specific configuration of the deploying device 10 is described. A flight direction of the aircraft is defined as front, and a direction opposite thereto is defined as rear.

Figure 2:
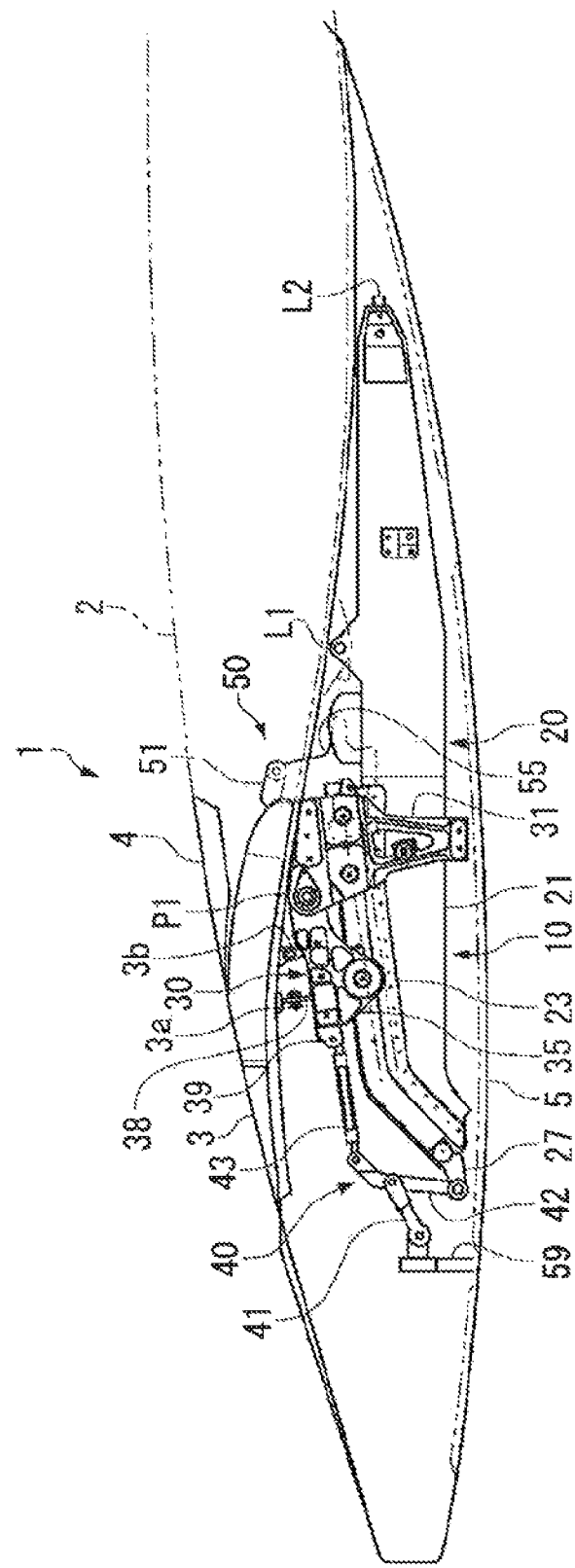
FIG. 2 is a view illustrating a flap deploying device according to a present embodiment.
Figure 3:
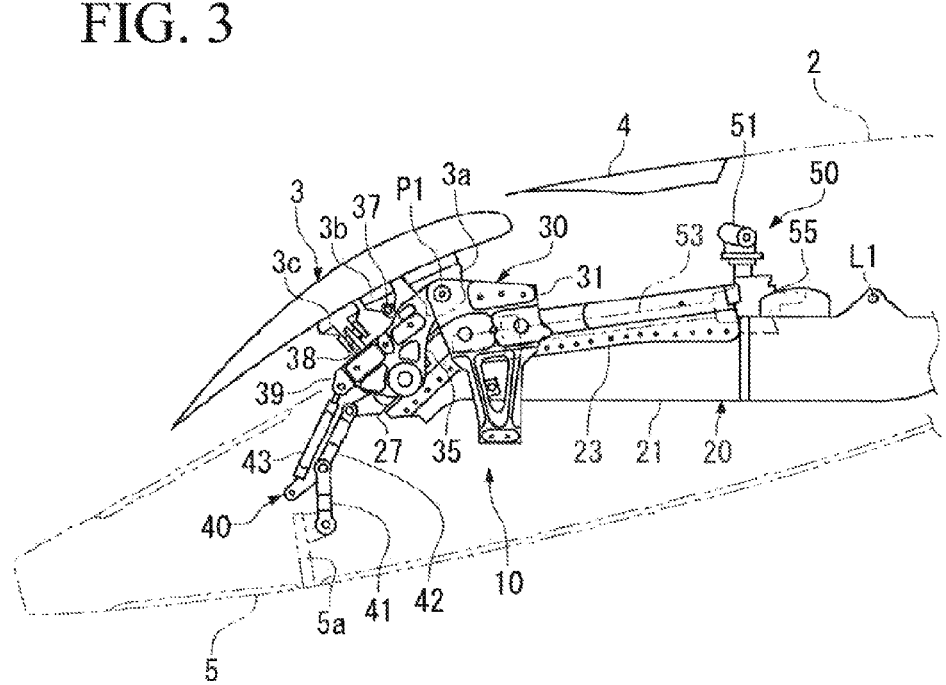
FIG. 3 is a view illustrating the flap deploying device when a flap is moved to a deployed position according to the present embodiment.

The deploying device 10 is accommodated within a movable FTF 5 when the flap 3 is at the retracted position as shown in FIG. 2. The FTF 5 is provided so as to reduce air resistance that the main wing 1 receives when the deploying device 10 is exposed on the outside. The FTF 5 is displaced following the flap 3. When the flap 3 is at the deployed position, the FTF 5 is rotated counterclockwise relative to the retracted position as shown in FIG. 3. Thus, the deploying device 10 is partly exposed from the FTF 5. However, the exposed portion is hidden behind the main wing body 2, so that an increase in the air resistance can be suppressed. Although the flap 3 provided at the trailing edge is described below, the same applies to a flap provided at a leading edge.

As shown in FIGS. 2 and 3, the deploying device 10 includes a track assembly 20, a carriage assembly 30, an FTF drive link 40, and an actuator 50 as main constituent elements.

The deploying device 10 moves the flap 3 between the retracted position and the deployed position by moving the carriage assembly 30 that supports the flap 3 along the track assembly 20 by the actuator 50. The FTF drive link 40 couples the track assembly 20 and the carriage assembly 30 to the FTF 5. The FTF drive link 40 is displaced along with the movement of the carriage assembly 30 to thereby move the FTF 5.

As shown in FIGS. 2 and 3, the track assembly 20 includes a support body 21 with ensured rigidity, and a track rail 23 supported on an upper surface of the support body 21. The support body 21 is fixed to a lower surface of the main wing body 2 at two positions of a position L1 and a position L2.

The track rail 23 is provided substantially along a chord direction.

Figure 4:
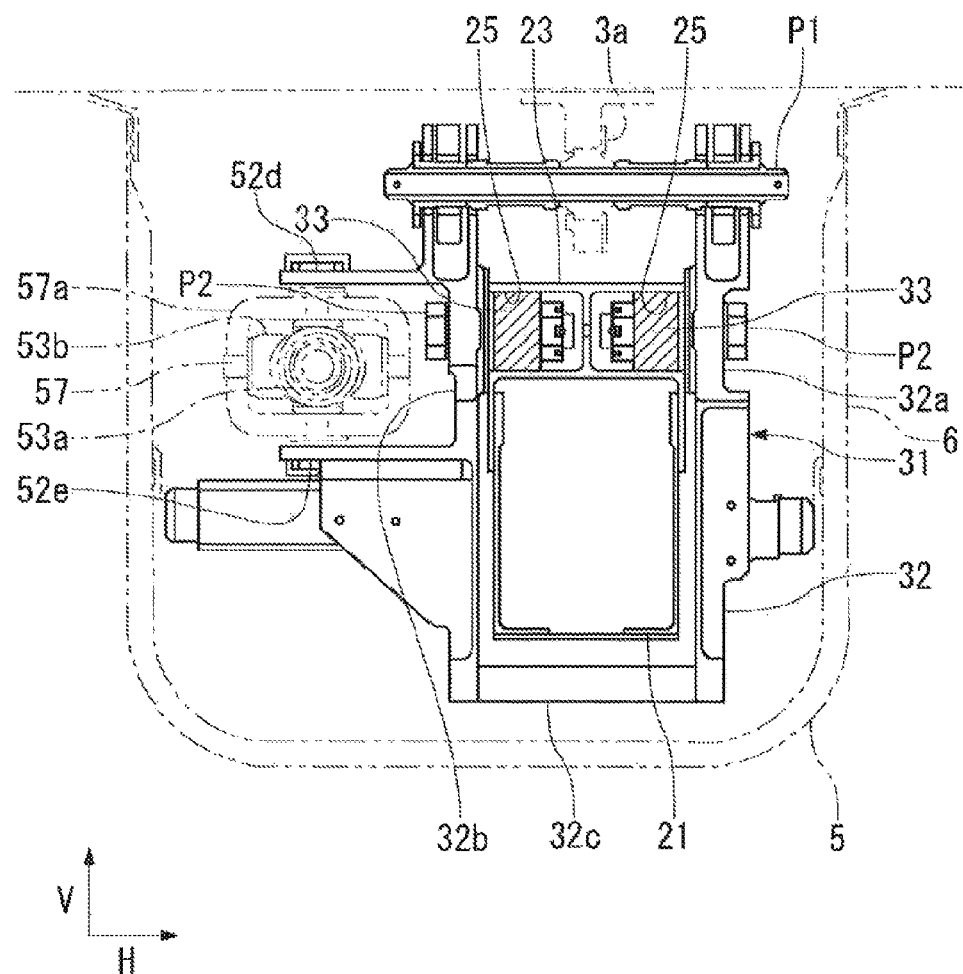
FIG. 4 is a view illustrating the arrangement of a screw jack in the flap deploying device according to the present embodiment.

The track rail 23 extends sloping linearly downward from a front side to a predetermined position, and slopes at a larger angle from the predetermined position. The carriage assembly 30 is guided along the path. As shown in FIG. 4, the track rail 23 includes a guide groove 25 composed of an H-shaped cross sectional portion. A roller 33 of the carriage assembly 30 runs while rolling in the guide groove 25.

A coupling fitting 27 to which the FTF drive link 40 is coupled is mounted to a rear end of the track rail 23. The coupling fitting 27 is fixed to the track rail 23.

The carriage assembly (a carriage mechanism) 30 supports the flap 3 and moves along the track rail 23 to thereby move the flap 3 between the retracted position and the deployed position. The carriage assembly 30 includes a forward carriage (a first carriage section) 31, and an aft carriage (a second carriage section) 35 (also see FIGS. 4 and 5). The forward carriage 31 and the aft carriage 35 are rotatably coupled to each other by a coupling pin P1. Thus, the forward carriage 31 and the aft carriage 35 integrally move along the track rail 23. When the aft carriage 35 reaches the portion where the track rail 23 slopes at a larger angle, the aft carriage 35 can move with an angle relative to the forward carriage 31 changed.

Figure 6:
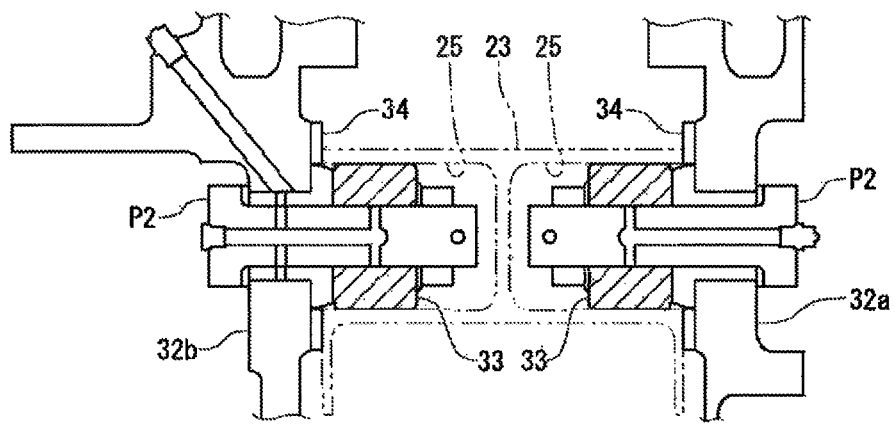
FIG. 6 is an enlarged sectional view around a track roller in the flap deploying device according to the present embodiment.

As shown in FIGS. 4 and 6, the forward carriage 31 includes a frame 32 having a U shape in cross section. A pair of side walls 32a and 32b constituting the frame 32 are arranged with the track rail 23 therebetween. A pair of rollers 33 are rotatably mounted to the insides of the respective side walls 32a and 32b of the frame 32 by fixing pins P2. The rollers 33 roll and run within the guide groove 25 of the track rail 23. The rollers 33 are provided in two sets that are arranged in a front-rear direction. The frame 32 includes a bottom wall 32c. The track assembly 20 including the track rail 23 is arranged in a region surrounded by the side walls 32a and 32b, and the bottom wall 32c. The coupling pin P1 is provided penetrating the side walls 32a and 32b in an upper portion opposing the bottom wall 32c. A coupling fitting 3a mounted to a lower surface of the flap 3 is rotatably coupled to the coupling pin P1.

As shown in FIG. 6, a pad 34 is interposed between the side wall 32a and the track rail 23, and between the side wall 32b and the track rail 23. The pad 34 is provided so as to cause the forward carriage 31 to smoothly slide on the track rail 23 when the forward carriage 31 moves. Therefore, the pad 34 is preferably made of a material with a low frictional coefficient such as a material containing polytetrafluoroethylene (PTFE). The same applies to the aft carriage 35.

Figure 5:
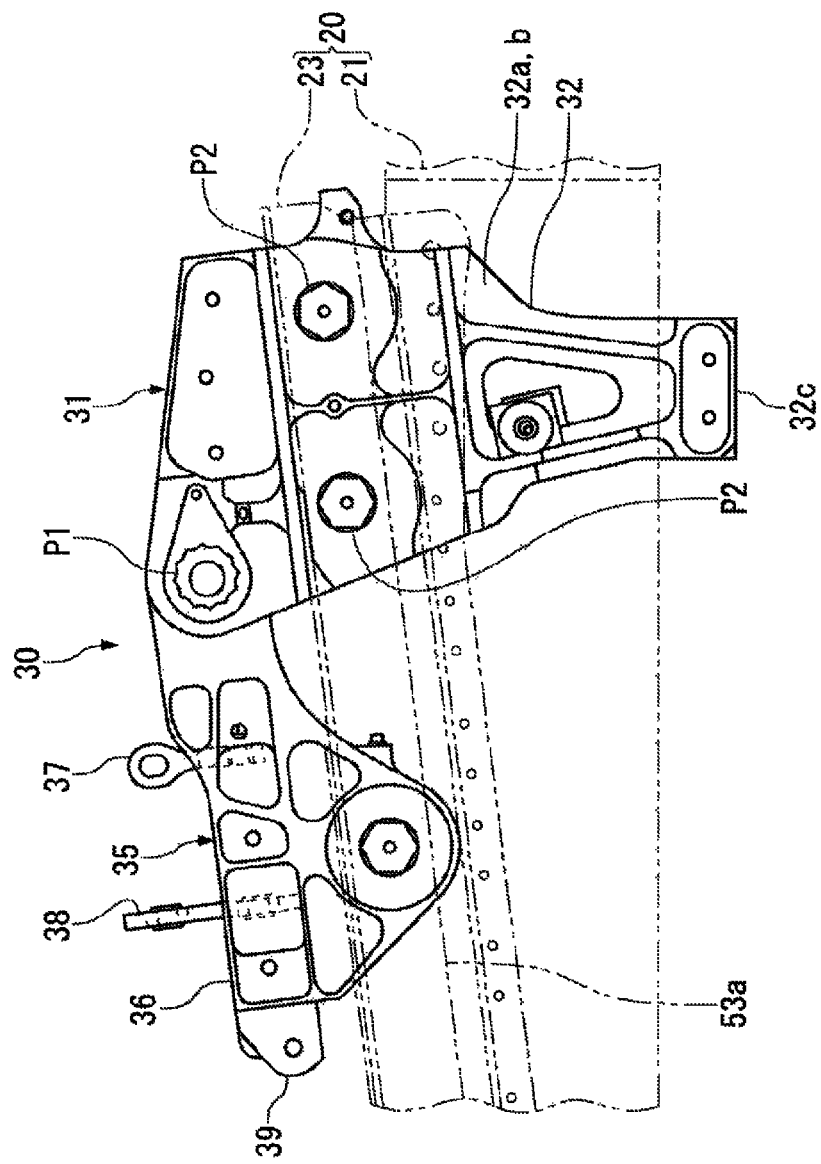
FIG. 5 is a view illustrating a carriage assembly in the flap deploying device according to the present embodiment.

As shown in FIG. 5, the aft carriage 35 includes a frame 36 having a U shape in cross section, and rollers (not shown) that roll and run within the guide groove 25 of the track rail 23 in a similar manner to the forward carriage 31.

Two coupling fittings 37 and 38 are mounted to the frame 36 at an interval so as to be rotatable clockwise and counterclockwise, respectively. As shown in FIG. 3, a coupling fitting 3b mounted to the lower surface of the flap 3 is rotatably coupled to the coupling fitting 37. A coupling fitting 3c mounted to the lower surface of the flap 3 is coupled to the coupling fitting 38 such that both the fittings can advance and retract.

A coupling fitting 39 to which the FTF drive link 40 is coupled is mounted to a rear end of the frame 36. The coupling fitting 39 is fixed to the frame 36.

The FTF drive link 40 constitutes a link mechanism that links the carriage assembly 30 to the FTF 5 so as to move the FTF 5 along with the movement of the carriage assembly 30.

The FTF drive link 40 includes a first link 41 that is rotatably coupled to a coupling fitting 5a fixed to the FTF 5, a second link 42 whose intermediate portion is rotatably coupled to an end portion of the first link 41, and a third link 43 whose one end is rotatably coupled to one end of the second link 42. The second link 42 is bent at the intermediate portion, and the other end thereof is rotatably coupled to the coupling fitting 27 of the track rail 23. The other end of the third link 43 is rotatably coupled to the coupling fitting 39 of the aft carriage 35.

The deploying device 10 having the aforementioned configuration includes the actuator 50 for driving the flap 3.

As shown in FIGS. 2 and 3, the actuator 50 includes an electric motor (a drive source) 51 that outputs torque, and a screw jack (a moving mechanism) 53 that operates with the output power of the electric motor 51 as main constituent elements. When the screw jack 53 operates in the front-rear direction, the flap 3 moves between the retracted position and the deployed position.

Figure 7:
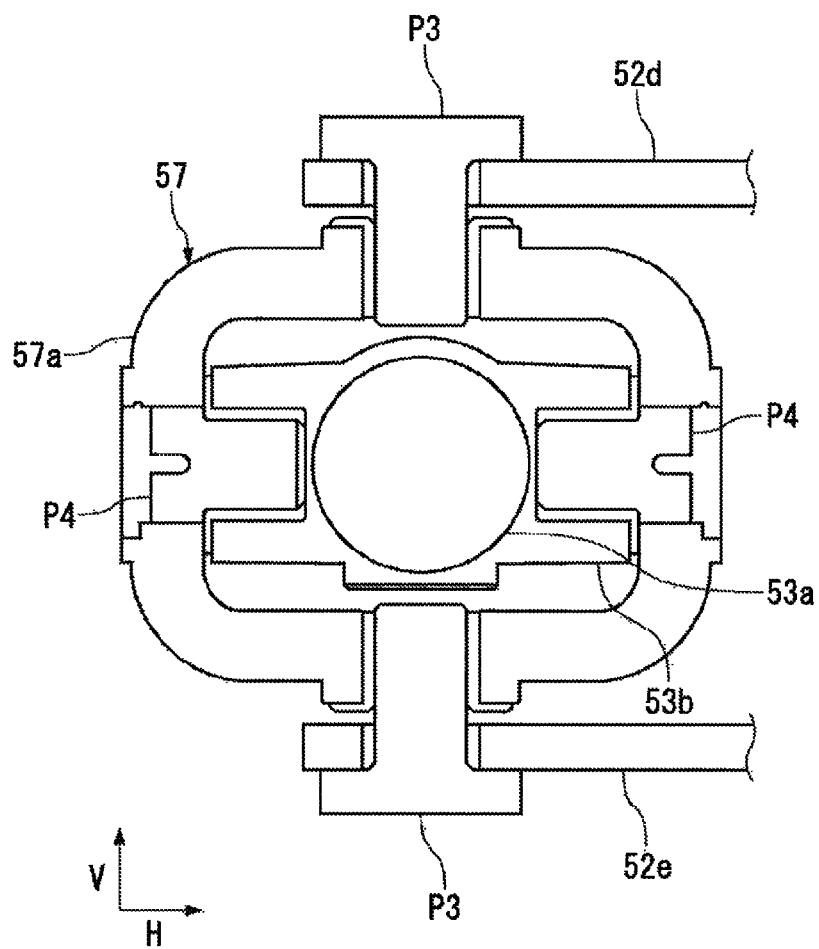
FIG. 7 is an enlarged view of a gimbal portion in FIG. 4.

As shown in FIGS. 4 and 7, the screw jack 53 includes a rod-like screw 53a and a moving body 53b that meshes with the screw 53a so as to be relatively rotatable. A male thread is formed around the screw 53a, and a female thread fitted to the male thread on the screw 53a is formed on the moving body 53b. The moving body 53b advances and retracts in directions (front and rear) according to a rotational direction when the screw 53a is rotated.

The screw 53a is rotatably supported on a speed changer 55 arranged on the front end side (FIGS. 2 and 3), and rotatably supported on a gimbal mechanism 57 fixed to the forward carriage 31 via the moving body 53b (FIG. 7). Accordingly, the axial rotation of the screw 53a is allowed, but the axial movement thereof is restricted. The speed changer 55 changes the speed of the output power of the electric motor 51 so as to fit to rotation required for the screw 53a. The moving body 53b is a constituent element of the gimbal mechanism 57.

The gimbal mechanism 57 is mounted to a pair of upper and lower arms 52d and 52e that extend laterally from the frame 32 of the forward carriage 31 as shown in FIGS. 4 and 7.

The gimbal mechanism 57 is provided so as to maintain the screw 53a in a fixed posture even when the forward carriage 31 is displaced in a horizontal direction H and a vertical direction V. To this end, the gimbal mechanism 57 includes a gimbal 57a and the moving body 53b arranged within the gimbal 57a. The gimbal 57a has a rotational axis along the vertical direction, and is rotatably supported on a support pin P3 that is fixed penetrating the arms 52d and 52e. The moving body 53b constituting the gimbal within the gimbal 57a has a rotational axis along the horizontal direction, and is rotatably supported on a support pin P4 that is fixed to the gimbal 57a in the horizontal direction. Since the moving body 53b is supported in the gimbal 57a as described above, the axial rotation of the screw 53a is restricted. Even when the forward carriage 31 is displaced in the horizontal direction H and the vertical direction V, the displacement is absorbed by the gimbal 57a and the moving body 53b respectively rotating in predetermined directions, so that the screw 53a is maintained in a fixed posture. The gimbal mechanism 57 can thereby smoothly maintain the meshing between the screw 53a and the moving body 53b.

The operation of the deploying device 10 having the aforementioned configuration when moving the flap 3 is described below.

When the electric motor 51 is driven to rotate the screw 53a of the screw jack 53 in a predetermined direction at the retracted position (FIG. 2), the moving body 53b moves backward. Since the moving body 53b is mounted to the arms 52d and 52e of the forward carriage 31 via the gimbal mechanism 57, the carriage assembly 30 moves backward while being guided along the track rail 23 in synchronization with the backward movement of the moving body 53b. Accordingly, the flap 3 mounted to the carriage assembly 30 also moves backward. Since the third link 43 of the FTF drive link 40 is coupled to the aft carriage 35, the third link 43 is pushed backward, and the second link 42 coupled to the third link 43, and the first link 41 coupled to the second link 42 are thereby rotated counterclockwise, so that the FTF 5 is moved counterclockwise.

When the carriage assembly 30 moves to an end point along the track rail 23, the flap 3 moves to the deployed position shown in FIG. 3, and the FTF 5 also moves to a position shown in FIG. 3.

To return the flap 3 at the deployed position to the retracted position, the electric motor 51 is rotated opposite to the direction to move the flap 3 to the deployed position.

The deploying device 10 according to the present embodiment is featured in that the screw jack 53 is arranged lateral to the track rail 23. The lateral side means a lateral side in a wingspan direction of the main wing body 2, and differs from a lateral side in the vertical direction, i.e., a thickness direction of the main wing body 2.

Although the screw jack 53 may be placed below or above the track rail 23, the screw jack 53 occupies a large space in the thickness direction of the main wing 1 in this case. It is thus necessary to increase the thickness of the main wing body 2, or increase the FTF 5 in the direction. In contrast, when the screw jack 53 is arranged lateral to the track rail 23, the main wing body 2 can be correspondingly made thinner, or the vertical dimension of the FTF 5 can be reduced. This means that the resistance that the aircraft receives during a flight is reduced, and flight performance can be improved.

When the screw jack 53 is arranged lateral to the track rail 23, the main wing 1 including the flap 3 can be also designed with a higher degree of freedom. That is, when a new type of aircraft is manufactured, an actuator suitable for the aircraft may be newly designed in some cases, and the existing actuator may be used in other cases as the actuator 50 including the screw jack 53. Although the actuator is newly designed in consideration of an arrangement place in the former case, this cannot be applied to the actuator in the latter case. Therefore, if the screw jack is allowed to be arranged lateral to the track rail in addition to the positions below and above the track rail, the degree of design freedom of the main wing 1 can be increased.

Although the present invention has been described above based on the embodiment, the gist of the present invention is that the screw jack 53 of the actuator 50 is arranged lateral to the track rail 23. The constitutions described in the embodiment described above may be also freely selected or changed into other constitutions without departing from the gist.

For example, the form of the track assembly 20 is merely an example. The track assembly 20 only needs to have a function to guide the carriage assembly 30 within a predetermined range. The same applies to the carriage assembly 30, the FTF drive link 40, and the actuator 50.

What is claimed is:

1. A flap deploying device which deploys a flap provided at a leading edge or a trailing edge of a main wing of an aircraft, the deploying device comprising:
   a drive source;
   a moving mechanism including a screw jack, the screw jack comprises a moving body advancing and retracting by power of the drive source;
   a carriage mechanism that carries advancing and retracting motion of the moving body to the flap so as to deploy the flap between a retracted position and a deployed position; and
   a rail that guides the carriage mechanism,
   wherein the drive source is an electric motor,
   the rail is a track rail,
   the screw jack including a screw that is rotationally driven by the drive source, the moving body meshing with the screw so as to be relatively rotatable, and
   the moving body and a gimbal are elements of a gimbal mechanism arranged lateral to the track rail in a wingspan direction of the main wing, the gimbal mechanism including at least two axes of rotation and being configured to smoothly maintain a meshing between the screw and the moving body.

2. The flap deploying device according to claim 1, wherein the flap is connected only to the carriage mechanism.

3. The flap deploying device according to claim 1, wherein the carriage mechanism includes a first carriage section and a second carriage section that are rotatably coupled to each other, the first carriage section and the second carriage section integrally moving along the rail.

4. The flap deploying device according to claim 1, wherein at least a portion of the flap deploying device is covered with a flap track fairing.

5. The flap deploying device according to claim 1, wherein the rail is provided substantially along a wing chord direction.

6. The flap deploying device according to claim 1, wherein the rail is supported on an upper surface of a support body with rigidity, and the support body is fixed to a lower surface of a main wing body of the main wing at least at two positions.

7. The flap deploying device according to claim 6, wherein the carriage mechanism is configured to move along the rail while supporting the flap on a lower surface of the flap, and thereby move the flap between the retracted position and the deployed position.

8. The flap deploying device according to claim 1, wherein the carriage mechanism is configured to move along the rail while supporting the flap on a lower surface of the flap, and thereby move the flap between the retracted position and the deployed position.

9. An aircraft comprising a flap at a leading edge or a trailing edge of a main wing, wherein the flap is driven by a deploying device, the deploying device comprising:

a drive source;

a moving mechanism including a screw jack, the screw jack comprises a moving body advancing and retracting by power of the drive source;

a carriage mechanism that carries advancing and retracting motion of the moving body to the flap so as to deploy the flap between a retracted position and a deployed position; and a rail that guides the carriage mechanism, wherein the drive source is an electric motor, the rail is a track rail, the screw jack including a screw that is rotationally driven by the drive source, the moving body meshing with the screw so as to be relatively rotatable, and the moving body and a gimbal device are elements of a gimbal mechanism arranged lateral to the track rail in a wingspan direction of the main wing, the gimbal mechanism including at least two axes of rotation and being configured to smoothly maintain a meshing between the screw and the moving body.

* * * * *